(12) United States Patent
Buchnik et al.

(10) Patent No.: US 12,229,445 B2
(45) Date of Patent: Feb. 18, 2025

(54) RECONFIGURATION FRAMEWORK FOR BYZANTINE FAULT TOLERANT (BFT) STATE MACHINE REPLICATION (SMR) SYSTEMS

(71) Applicant: VMware LLC, Palo Alto, CA (US)

(72) Inventors: Yehonatan Buchnik, Rosh Ha'ayin (IL); Ittai Abraham, Tel Aviv (IL); Toly Kournik, Herzliya (IL); Nikhil Kumar, Bangalore (IN); Nikolay Kolev Georgiev, Sofia (BG)

(73) Assignee: VMware LLC, Palo Alto, CA (US)

( * ) Notice: Subject to any disclaimer, the term of this patent is extended or adjusted under 35 U.S.C. 154(b) by 11 days.

(21) Appl. No.: 18/070,503

(22) Filed: Nov. 29, 2022

(65) Prior Publication Data

US 2024/0094953 A1    Mar. 21, 2024

(30) Foreign Application Priority Data

Sep. 1, 2022   (IN) .............................. 202241050065

(51) Int. Cl.
    *G06F 12/00*     (2006.01)
    *G06F 3/06*      (2006.01)
(52) U.S. Cl.
    CPC .......... *G06F 3/0659* (2013.01); *G06F 3/0629* (2013.01); *G06F 3/067* (2013.01); *G06F 3/0622* (2013.01)

(58) Field of Classification Search
    CPC ....... G06F 3/0629; G06F 3/0659; G06F 3/067
    USPC ...................................................... 711/154
    See application file for complete search history.

(56) References Cited

U.S. PATENT DOCUMENTS

| | | | |
|---|---|---|---|
| 6,671,821 B1 * | 12/2003 | Castro ................ | G06F 11/1482 714/21 |
| 11,132,203 B2 * | 9/2021 | Wiencke ............... | G06F 9/3836 |
| 11,650,760 B2 * | 5/2023 | Kanno .................. | G06F 3/0604 711/103 |
| 2017/0153881 A1 * | 6/2017 | Bortnikov ............... | G06F 8/656 |
| 2018/0157558 A1 * | 6/2018 | Karame .................. | G06F 11/07 |
| 2019/0251007 A1 * | 8/2019 | Mac Brough ......... | G06F 11/187 |
| 2021/0160152 A1 * | 5/2021 | Spiegelman ........ | H04L 67/1001 |
| 2023/0138816 A1 * | 5/2023 | Nguyen ................ | G16Y 30/10 726/26 |
| 2024/0094953 A1 * | 3/2024 | Buchnik ................ | G06F 3/067 |

* cited by examiner

*Primary Examiner* — Mohamed M Gebril
(74) *Attorney, Agent, or Firm* — Quarles & Brady LLP

(57) ABSTRACT

The present disclosure is directed to a novel reconfiguration framework for a BFT SMR system. With this framework, the configuration of both the system itself and the clients of the system can be modified in a live manner (i.e., without taking the system offline) while preserving correct system operation.

18 Claims, 7 Drawing Sheets

RECONFIGURATION FRAMEWORK FOR BYZANTINE FAULT TOLERANT (BFT) STATE MACHINE REPLICATION (SMR) SYSTEMS

RELATED APPLICATIONS

Benefit is claimed under 35 U.S.C. 119(a)-(d) to Foreign Application Serial No. 202241050065 filed in India entitled "RECONFIGURATION FRAMEWORK FOR BYZANTINE FAULT TOLERANT (BFT) STATE MACHINE REPLICATION (SMR) SYSTEMS", on Sep. 1, 2022, by VMware, Inc., which is herein incorporated in its entirety by reference for all purposes.

BACKGROUND

Unless specifically indicated herein, the approaches described in this section should not be construed as prior art to the claims of the present application and are not admitted to be prior art by inclusion in this section.

State machine replication (SMR) is an approach for building fault-tolerant services that involves deploying multiple identical server instances, known as replicas, and coordinating interactions between clients and the replicas in a manner that ensures all non-faulty replicas execute client requests in the same order and thus maintain the same service state. This allows a subset of the replicas to fail without affecting service availability for the clients. Byzantine fault tolerant (BFT) SMR is a type of SMR that can tolerate a threshold number of Byzantine replicas, which are faulty replicas capable of displaying arbitrary behavior (including collusion with other faulty replicas). A set of replicas that implement BFT SMR is referred to as a BFT SMR system and the mechanism by which such replicas implement BFT SMR is referred to as a BFT SMR protocol. Examples of known BFT SMR protocols include Practical BFT (PBFT), Tendermint, HotStuff, and so on.

In BFT SMR systems, it is occasionally necessary to make changes to the system's configuration. However, applying these configuration changes during runtime may break certain assumptions made by the system's BFT SMR protocol, resulting in incorrect operation. One way to avoid this issue is to bring the system offline, apply the configuration changes, and then bring the system back online with its new configuration in place. However this approach can result in a significant amount of service downtime and disruption for clients, which is undesirable. In addition, this approach relies on a centralized entity to implement the configuration changes, which exposes the system to a single point of failure.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to a reconfiguration framework for a BFT SMR system. With this framework, the configuration of both the system itself and the clients of the system can be modified in a live manner (i.e., without taking the system offline) while preserving correct system operation.

1. Example Environment and Solution Architecture

Figure 1:
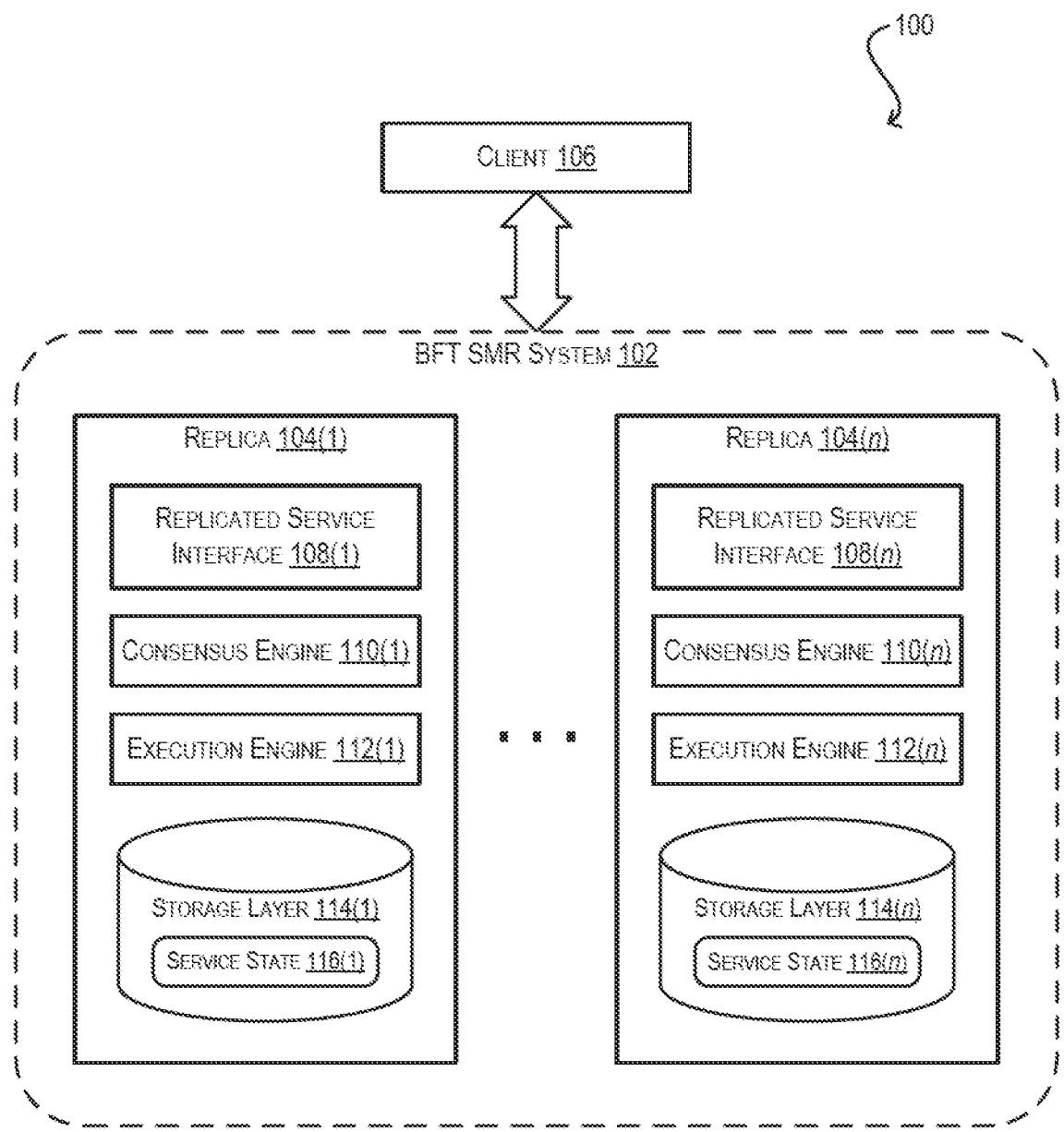
FIG. 1 depicts an example environment comprising a BFT SMR system according to certain embodiments.

FIG. 1 depicts an example environment 100 in which the techniques of the present disclosure may be implemented. As shown, environment 100 includes a BFT SMR system 102 comprising n server replicas 104(1)-(n) (referred to herein as simply replicas) that are communicatively coupled with a client computing system/device 106 (referred to herein as simply a client). Although only a single client is depicted for purposes of illustration, multiple clients may be supported. It is assumed that replicas 104(1)-(n) are connected to client 106 and to each other via an asynchronous or partially synchronous network, which is analogous to most real-world networking scenarios. In an asynchronous network, there is no upper bound on message transmission delays and thus it is possible for some messages sent by a sender to never reach their recipients. In a partially synchronous network, there is a known upper bound on message transmission delays only after an unknown point in time referred to as Global Stabilization Time (GST); before GST, the network is asynchronous.

Replicas 104(1)-(n) are configured to provide a fault-tolerant service to client 106 by receiving service requests from the client (referred to herein as client requests or simply requests) and by replicating the processing of those requests on each replica. The service may be, e.g., a blockchain service, a banking service, or any other service that maintains and updates persistent data, referred to as service state, in accordance with a state machine paradigm (i.e., a paradigm where the data begins at an initial state and transitions to subsequent states deterministically based on received inputs). To that end, each replica 104 exposes a replicated service interface 108 to client 106. In addition, each replica 104 includes a consensus engine 110, an execution engine 112, and a storage layer 114 configured to hold the service state (reference numeral 116) maintained by the replica. In a particular embodiment, system 102 may be a permissioned blockchain system and storage layer 114 may be a blockchain.

In operation, the service state of each replica 104 is initialized to be the same (i.e., an initial state). Then, as client 106 submits requests to system 102, the client and replicas interact with each other using a BFT SMR protocol to ensure that all non-faulty replicas execute the requests in the same order (known as the property of "safety"), thereby keeping the service states of the non-faulty replicas consistent with each other. This safety property is preserved as long as the number of faulty replicas does not exceed a threshold f defined by the BFT SMR protocol. In some cases, depending on the network synchrony model assumed, the BFT SMR protocol may also guarantee that all requests are eventually completed (known as the property of "liveness").

Figure 2:
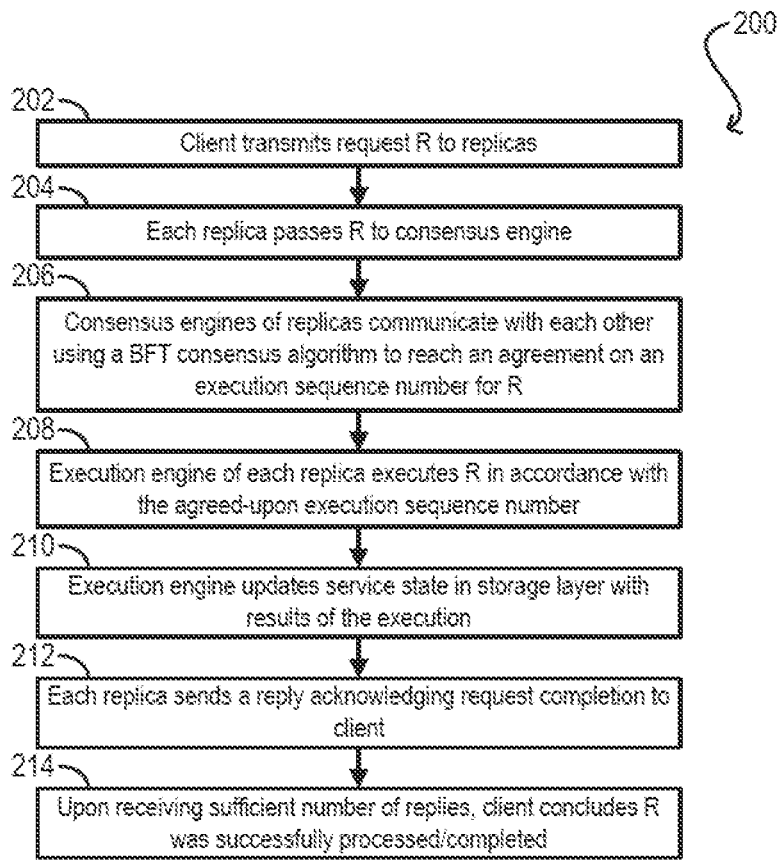
FIG. 2 depicts a flowchart for processing a client request using a BFT SMR protocol.

To clarify the foregoing, FIG. 2 depicts a flowchart 200 that may be executed by client 106 and replicas 104(1)-(n) for processing a client request using a conventional BFT SMR protocol. In this flowchart, it is assumed that every protocol message communicated between the client and replicas (and between the replicas themselves) is digitally signed by the sender and verified by receiver upon message receipt via public/private key cryptography. In addition, it is assumed that all network traffic between the client and replicas is encrypted using an appropriate network security scheme (e.g., Transport Layer Security (TLS)).

Starting with step 202, client 106 transmits a request R to each replica 104. Because the replicas may not receive R in the same order relative to other requests sent by client 106 and/or other clients, each replica 104 passes R to its consensus engine 110 (step 204) and the consensus engines communicate with each other using a BFT consensus algorithm to reach an agreement on an execution sequence number for the request (step 206). For example, the consensus engines may agree to execute R as the 100th request out of all incoming client requests.

Once a consensus on the execution sequence number for R is reached, execution engine 112 of each replica 104 independently executes R based on that ordering (step 208) and updates its service state 116 held in storage layer 114 with the results of the execution (step 210). Further, the replica sends a reply acknowledging completion of the request to client 106 (step 212). Finally, upon receiving a sufficient number of replies from the replicas, client 106 concludes that R was successfully processed/completed (step 214) and the workflow ends. For example, in the case of PBFT, client 106 can conclude that R was successfully processed/completed upon receiving at least f+1 replies from the replicas where $$f = \frac{n-1}{3}.$$

As mentioned in the Background section, the administrators of a BFT SMR system like system 102 of FIG. 1 may wish to occasionally modify the configuration of the system and/or the system's clients for various reasons. These modifications may include, e.g., scaling up the number of replicas, scaling down the number of replicas, upgrading the software on the replicas or clients, exchanging protocol keys (i.e., public/private keys used for protocol message signing) for one or more replicas or clients, and so on. However, implementing such modifications introduces several complexities that can result in incorrect system operation.

For example, consider a scenario in which an administrator of system 102 issues a scale up command for increasing the number of replicas n. For the BFT SMR protocol used by the system to work correctly, all of the replicas must assume the same n at all times (as this affects certain protocol message exchanges and computations). However, because the replicas are separate entities that operate asynchronously, they will not apply this scale up command at exactly the same time. Accordingly, there will be points at which some replicas assume the old n (prior to the change) and other replicas assume the new n (after the change).

Further, in the example above, client 106 must also assume the same n as the replicas for correct system operation, and thus must also apply the scale up command to its own configuration. For instance, if client 106 assumes that n=5 when in fact n is increased to 10, the client may prematurely conclude that a given request has been successfully processed/completed at step 214 of flowchart 200 because f is dependent on n. However, in existing BFT SMR systems, there is no mechanism to synchronize such a configuration change across both replicas and clients.

Yet further, in existing BFT SMR systems it is not possible to change certain configuration parameters of a client (e.g., protocol keys, TLS keys, etc.) without breaking that client's ability to communicate with the system.

A workaround for these complexities is to simply place system 102 in an offline/maintenance mode when a configuration change is needed and apply the change to the system while in the offline/maintenance mode. However, this leads to service downtime and disruption (which is problematic if the system is deployed in a production environment and/or reconfiguration is needed on a relatively frequent basis) and generally requires a centralized entity to orchestrate the configuration change process (which exposes the system to a single point of failure).

Figure 3:
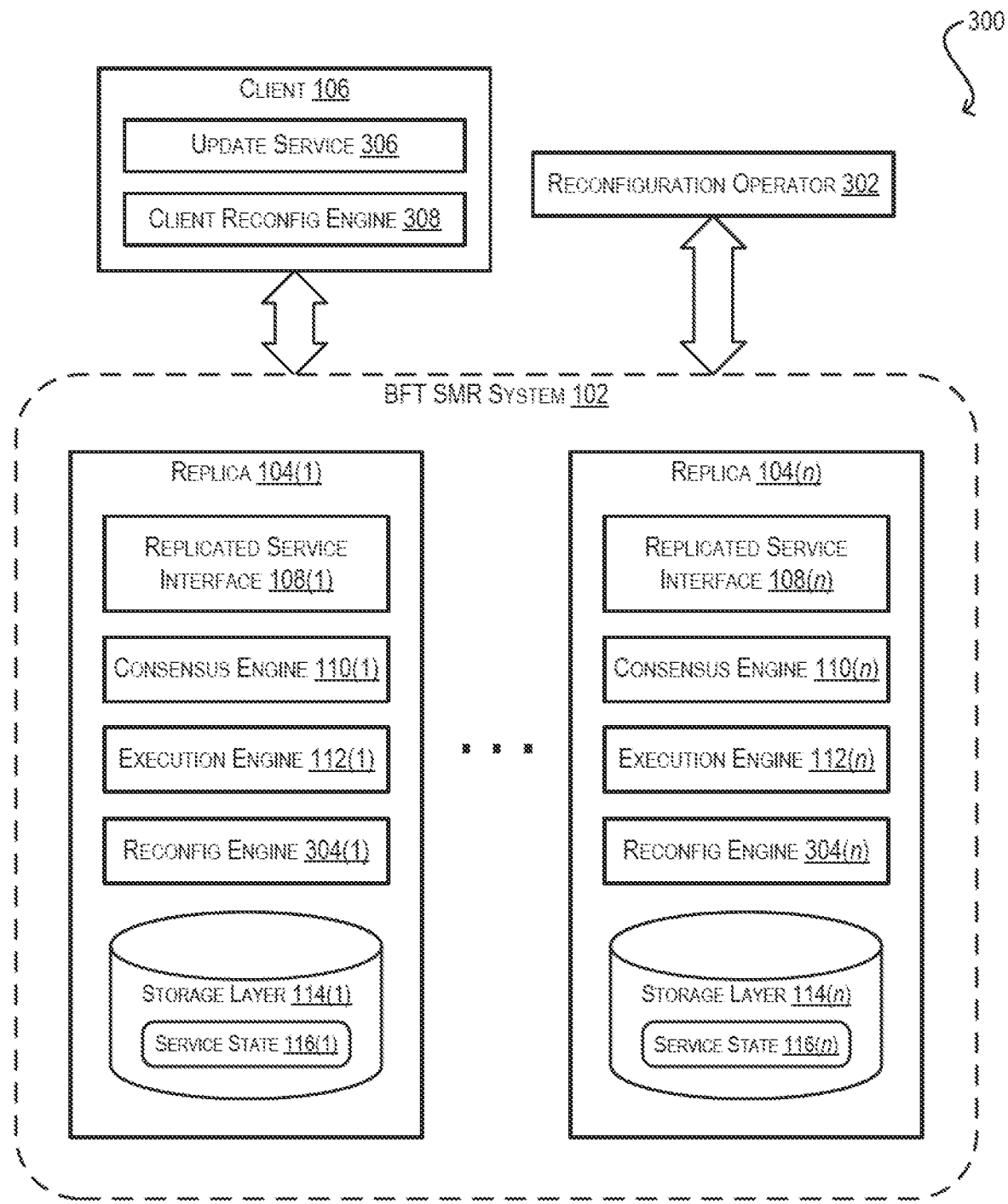
FIG. 3 depicts an enhanced version of the environment of FIG. 1 that implements a reconfiguration framework according to certain embodiments.

To address the foregoing, FIG. 3 depicts an enhanced version of environment 100 (i.e., environment 300) that implements a novel reconfiguration framework for system 102 according to certain embodiments. As shown, this reconfiguration framework includes a new reconfiguration operator 302 that is authorized to generate and send reconfiguration commands to the replicas of system 102. For example, reconfiguration operator 302 may be operated by an administrator of environment 300/system 102. Reconfiguration operator 302 is limited in its abilities according to the policies/design of the reconfiguration framework; accordingly, this operator cannot initiate reconfiguration commands or take other actions that are not specifically authorized by the framework. In some embodiments, reconfiguration operator 302 may be a distributed entity. In addition, the reconfiguration framework includes a new reconfiguration engine 304 on each replica 104 and a new update service 306 and client reconfiguration engine 308 on client 106.

At a high level, the reconfiguration framework components depicted in FIG. 3 can implement various techniques that allow replicas 104(1)-(n) and client 106 to be reconfigured while system 102 is live (i.e., operational), without breaking the security property of the system's BFT SMR protocol. For example, according to one set of techniques (referred to herein as "wedge-assisted replica reconfiguration" and detailed in section (2) below), at the time a configuration change to replicas 104(1)-(n) is needed/desired that requires the service states of the replicas to be in sync, reconfiguration engines 304(1)-(n) can carry out a distributed "wedge" protocol to temporarily halt (i.e., wedge) the system at a certain service state point, referred to as a wedge point. The reconfiguration engines can then execute the configuration change on replicas 104(1)-(n) while the system is wedged at the wedge point, which guarantees that each replica will execute the change at the same "state time," regardless of the asynchronous nature of system 102.

According to another set of techniques (referred to herein as "client reconfiguration" and detailed in section (3)

below), at the time a configuration change to client 106 is needed/desired, reconfiguration operator 302 can send a reconfiguration command specifying that client-side change to replicas 104(1)-(n). In response, reconfiguration engines 304(1)-(n) can write the reconfiguration command to their respective storage layers (thereby updating the replicas' service states with this information), and the presence of this command in the storage layer can be detected by update service 306 of client 106. Update service 306 can then retrieve the reconfiguration command from the storage layer and client reconfiguration engine 308 can execute it on the client side. In addition, client reconfiguration engine 308 can update the storage layer of system 102 with the results/output/status of the executed configuration change.

This approach ensures that replicas 104(1)-(n) are made aware of the configuration change on client 106, which means the replicas can update their own configurations as needed to be consistent with that client-side change (and thus avoid communication disruptions with the client). For example, if the configuration change involves an exchange of protocol keys at client 106, replicas 104(1)-(n) can update their configurations with the new public key of client 106. This approach also advantageously records all client-side configuration changes in the storage layer of system 102, thereby allowing the system to maintain a full log of the reconfiguration history of both its replicas and its clients.

According to yet another set of techniques (referred to herein as "two-stage client/replica reconfiguration" and detailed in section (4) below), if a configuration change to replicas 104(1)-(n) is needed/desired that also requires synchronization to client 106 for proper system operation, a two-stage reconfiguration protocol can be employed that involves (1) generating and processing a first reconfiguration command corresponding to the client-side change necessitated by the replica-side change, and (2) generating and processing a second reconfiguration command corresponding to the replica-side change once the first reconfiguration command is completed. By updating client 106 first via stage (1), this approach ensures that the client is correctly configured to continue communication with replicas 104(1)-(n) once the replicas are updated via stage (2). Note that any requests sent by client 106 after the first stage is completed but before the second stage is completed will fail because the configurations of the client and replicas will not be consistent during this time window; however, the client can simply retry those requests until they are successful, which should occur once the second reconfiguration command is processed and the replica configurations are brought in sync with the client configuration.

It should be appreciated that FIGS. 1-3 are illustrative and not intended to limit embodiments of the present disclosure. For example, although FIG. 3 depicts a particular arrangement of reconfiguration framework components within environment 300, other arrangements are possible (e.g., the functionality attributed to a particular component may be split into multiple components, components may be combined, etc.). One of ordinary skill in the art will recognize other variations, modifications, and alternatives.

2. Wedge-Assisted Replica Reconfiguration

Figure 4:
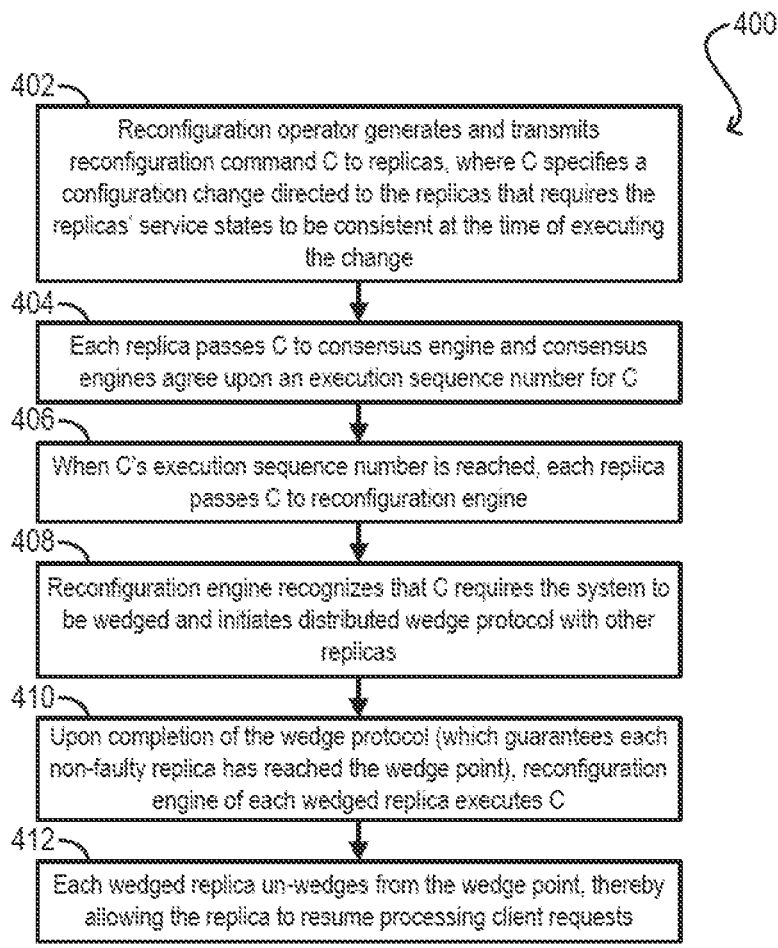
FIG. 4 depicts a flowchart for implementing wedge-assisted replica reconfiguration according to certain embodiments.

FIG. 4 depicts a flowchart 400 that may be executed by the reconfiguration framework components of FIG. 3 for implementing wedge-assisted replica reconfiguration according to certain embodiments.

Starting with step 402, reconfiguration operator 302 can generate and transmit a reconfiguration command C to replicas 104(1)-(n) where C specifies a configuration change directed to the replicas that requires the replicas' service states to be consistent/synchronized at the time of executing the change. Examples of such configuration changes include scaling up (i.e., increasing) the number of replicas, scaling down (i.e., decreasing) the number of replicas, and upgrading the software on all replicas.

At step 404, each replica 104 can pass C to its consensus engine 110 and the consensus engines can agree upon an execution sequence number for the reconfiguration command. This step is identical to the consensus processing applied to a standard client request as described at steps 204 and 206 of flowchart 200.

When C's execution sequence number is reached, each replica 104 can pass the command to its reconfiguration engine 304, which is essentially another execution engine (separate from existing execution engine 112) that is specifically designed to understand and execute reconfiguration commands (step 406). In response, the reconfiguration engine can recognize that C requires the system to be wedged and can initiate execution of a distributed wedge protocol with the other reconfiguration engines of system 102 (step 408). Generally speaking, this wedge protocol enables all non-faulty replicas to agree upon and reach a future, common service state point (i.e., wedge point) at which the replicas will temporarily halt their processing of incoming client requests. For example, if the storage layer of system 102 is a blockchain, all non-faulty replicas can agree to wedge the system at a certain future block b and can interact in a manner that guarantees each non-faulty replica in fact reaches b. This ensures that the non-faulty replicas are synchronized on the same service state before proceeding with the configuration change. A particular implementation of the wedge protocol is described in section (2.1) below.

In certain embodiments, the execution of the wedge protocol can be transparent to client 106 and thus the client can be unaware that system 102 is being briefly halted via this mechanism. In these embodiments, from the client's point of view, the system may simply appear to respond a bit slower than normal while the system is wedged.

Upon completion of the wedge protocol (which guarantees that all non-faulty replicas have reached the wedge point as noted above), reconfiguration engine 304 of each wedged replica 104 can carry out the configuration change specified in C, thereby executing the reconfiguration command (step 410). Although not shown, as part of step 410, each reconfiguration engine can also write the results/output/status of the completed configuration change to the replica's storage layer, thereby recording that change the replica's service state.

Finally, at step 412, each wedged replica can "un-wedge" from the wedge point, which allows the replica to resume processing client requests, and the flowchart can end.

2.1 Wedge Protocol Implementation

Figure 5:
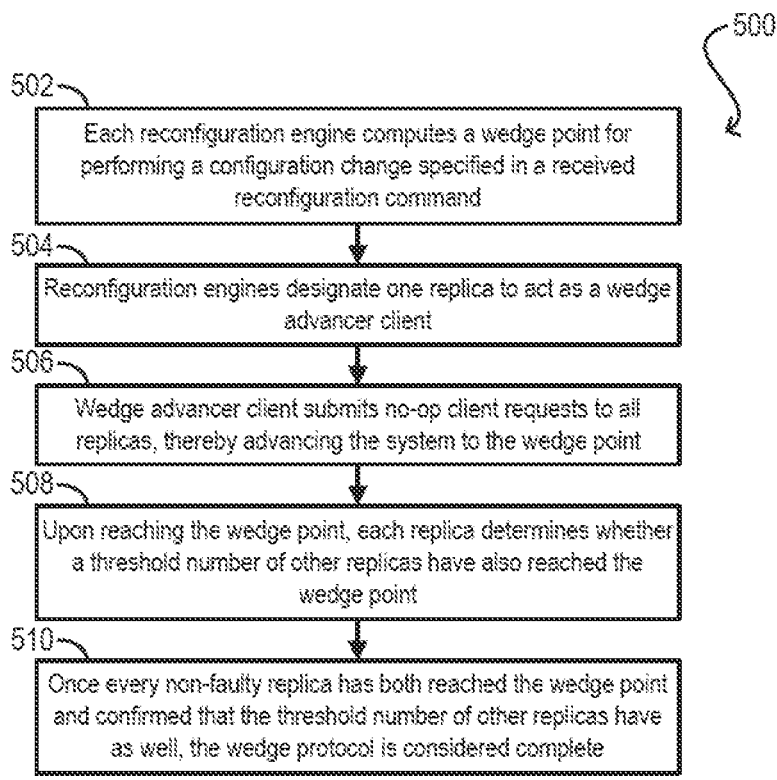
FIG. 5 depicts a flowchart for implementing a wedge protocol according to certain embodiments.

FIG. 5 depicts a flowchart 500 that may be executed by reconfiguration engines 304(1)-(n) of replicas 104(1)-(n) for implementing the distributed wedge protocol described above according to certain embodiments. Flowchart 500 assumes that the wedge protocol has been initiated per step 408 of FIG. 4.

Starting with step 502, each reconfiguration engine 304 can compute, via a deterministic algorithm, a future wedge point for performing the configuration change specified in a received reconfiguration command (i.e., command C of flowchart 400). As mentioned previously, this wedge point may be a future block number in the scenario where the storage layer of system 102 is implemented as a blockchain. Alternatively, this wedge point may be a future execution sequence number.

At step 504, the reconfiguration engines can designate one of the replicas to act as a "wedge advancer client." The designated wedge advancer client can then submit no-op client requests to all replicas (step 506). In this way, the system can advance the service state of each replica to reach the wedge point, without relying on the receipt of actual client requests from client 106.

Upon reaching the wedge point via the no-op requests sent by the wedge advancer client, each replica 104 can determine whether a threshold number t of other replicas have also reached the wedge point (step 508). In one set of embodiments, the replica can make this determination by leveraging a SMR feature known as checkpointing. Generally speaking, checkpointing involves periodically sending, by each replica to other replicas, a checkpoint message that is associated with an execution sequence number recently reached by the replica (and that contains a summary of the replica's service state up to that execution sequence number, referred to as a checkpoint). In these embodiments, the wedge point can be set to an execution sequence number s that is associated with a checkpoint and, upon reaching s, each replica can continuously broadcast its checkpoint message for s to other replicas via the checkpointing mechanism. Once t checkpoint messages for s have been received from other replicas, the replica can conclude that t other replicas have reached the wedge point per step 508.

Finally, once every non-faulty replica has both reached the wedge point and determined that t other replicas have also reached the wedge point, the wedge protocol is considered complete (i.e., system 102 is now wedged at the wedge point) (step 510) and the flowchart can end.

3. Client Reconfiguration

Figure 6:
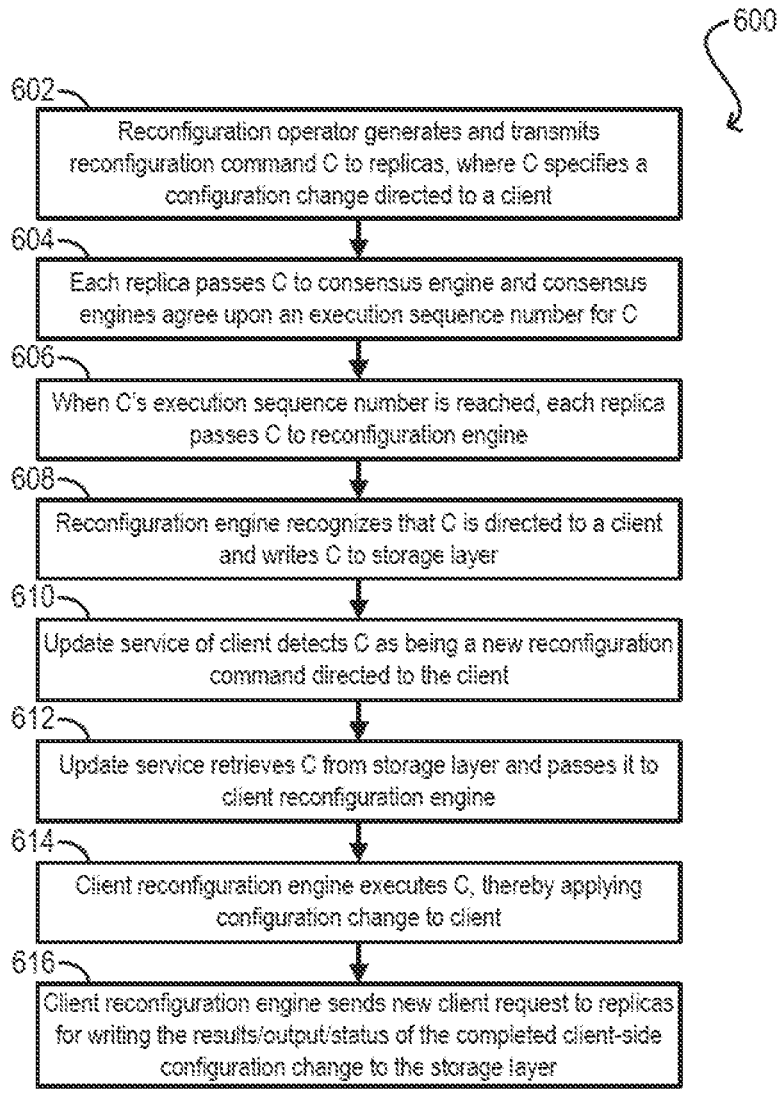
FIG. 6 depicts a flowchart for implementing client reconfiguration according to certain embodiments.

FIG. 6 depicts a flowchart 600 that may be executed by the reconfiguration framework components of FIG. 3 for implementing client reconfiguration according to certain embodiments.

Starting with step 602, reconfiguration operator 302 can generate and transmit a reconfiguration command C to replicas 104(1)-(n) where C specifies a configuration change directed to client 106. Examples of such client-side configuration changes include exchanging the client's protocol keys, exchanging the client's TLS keys, and upgrading the client's software.

At step 604, each replica 104 can pass C to its consensus engine 110 and the consensus engines can agree upon an execution sequence number for the reconfiguration command. This step is identical to the consensus processing applied to a standard client request as described at steps 204 and 206 of flowchart 200.

When C's execution sequence number is reached, each replica 104 can pass the command to its reconfiguration engine 304 (step 606). In response, the reconfiguration engine can recognize that C is directed to client 106 and can write the reconfiguration command to its storage layer 114 (step 608).

At step 610, update service 306 of client 106 can detect C as being a new reconfiguration command in the storage layer of system 102 that is directed to the client. In one set of embodiments, update service 306 can implement this detection by periodically polling the storage layer for such client-side reconfiguration commands. Update service 306 can then retrieve C from the storage layer and can pass it to client reconfiguration engine 308 (step 612).

In response, client reconfiguration engine 308 can carry out the configuration change specified in the retrieved reconfiguration command, thereby applying the change to client 106 (step 614).

Finally, at step 616, client reconfiguration engine 308 can send a new client request to replicas 104(1)-(n) for writing the results/output/status of the completed client-side configuration change to their storage layers 114(1)-(n). In this way, a record of that change can be maintained by system 102. In certain embodiments, the new client request sent at step 616 can specifically include replica-side configuration change information directed to replicas 104(1)-(n) in view of the client-side configuration change. For example, assume the client-side configuration change is an exchange of client 106's protocol keys (i.e., public and private keys used for protocol message signing). In this scenario, the new public key of client 106 can be sent to the replicas via the new client request. The reconfiguration engines of the replicas can subsequently apply this new public key on the replica side, and client 106 can begin using the new private/public key pair for protocol message signing once it has received replies from a threshold number of replicas that the client request has been successfully processed/completed.

4. Two-Stage Client/Replica Reconfiguration

Figure 7:
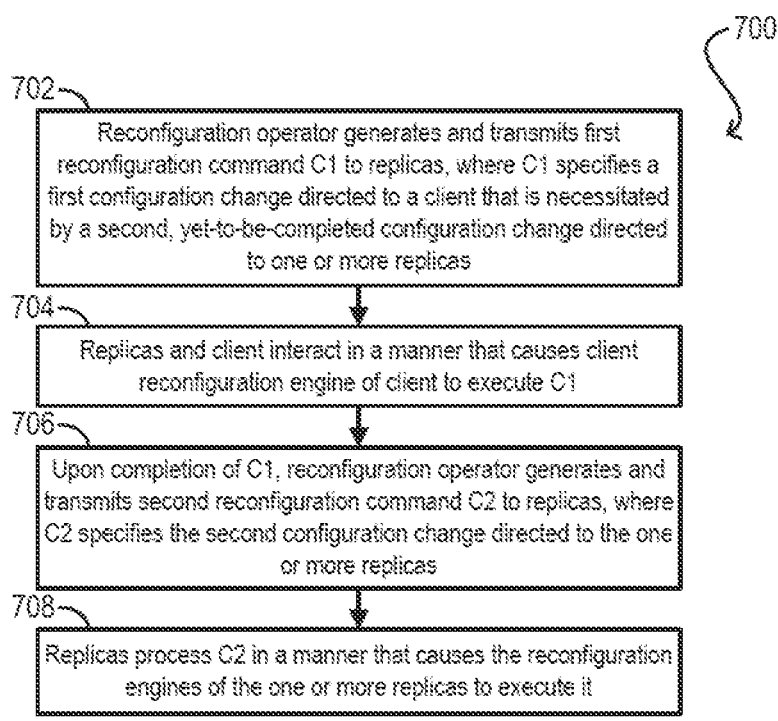
FIG. 7 depicts a flowchart for implementing two-stage client/replica reconfiguration according to certain embodiments.

FIG. 7 depicts a flowchart 700 that may be executed by the reconfiguration framework components of FIG. 3 for implementing two-stage client/replica reconfiguration according to certain embodiments. As noted in section (1), this technique is applicable to configuration changes directed to one or more replicas that also require synchronized changes on the client side. Examples of such replica-side configuration changes include the scaling up of replicas, the scaling down of replicas, and so on. In flowchart 700, steps 702 and 704 correspond to the first stage (i.e., client-side reconfiguration) and steps 706 and 708 correspond to the second stage (i.e., replica-side reconfiguration).

Starting with step 702, reconfiguration operator 302 can generate and transmit a first reconfiguration command C1 to replicas 104(1)-(n) where C1 specifies a first configuration change directed to client 106 necessitated by a second, yet-to-be-implemented configuration change directed one or more replicas. For example, if the second configuration change is a scaling of the number of replicas n from 5 to 10, the first configuration change specified in C1 can indicate that client 106 should also modify its understanding of the total number of replicas from 5 to 10.

At step 704, replicas 104(1)-(n) and client 106 can interact in a manner that causes client reconfiguration engine 308 to receive C1 and execute it on client 106. For example, in some embodiments replicas 104(1)-(n) and client 106 can carry out a workflow with respect to C1 that is similar or identical to client reconfiguration flowchart 600 of FIG. 6.

Upon determining that C1 has been successfully processed/completed, reconfiguration operator 302 can generate and transmit a second reconfiguration command C2 to replicas 104(1)-(n) where C2 specifies the second configuration change noted above directed to one or more replicas (step 706).

Finally, at step 708, replicas 104(1)-(n) can process C2 in a manner that causes the reconfiguration engine(s) 304 of the replicas affected by C2 to execute it. For example, in some embodiments the replicas can carry out a workflow with respect to C2 that is similar or identical to wedge-assisted replica reconfiguration flowchart 400 of FIG. 4. In other embodiments, if the wedge protocol is not needed to execute C2, the replicas can directly execute the reconfiguration command via their respective reconfiguration engines without first halting at a wedge point. Once replicas 104(1)-(*n*) have been reconfigured in accordance with step 708, client 106 will be able to communicate with the replicas because their configurations will now be consistent and thus system 102 can continue operating as normal.

It should be noted that although flowchart 700 assumes that reconfiguration operator 302 takes the initiative of sending out the two different reconfiguration commands C1 and C2, in some embodiments reconfiguration operator 302 may only send out second reconfiguration command C2 to the replicas. Upon receiving C2, a designated replica can identify C2 as requiring a synchronized configuration change on the client side and can send out C1 to implement the client-side change. Then, once C1 is completed, the client can send a notification of this completion to the replicas (through, e.g., a consensus mechanism) and C2 can be processed by the replicas to implement the replica-side change. With this alternative approach, reconfiguration operator 302 does not need to be aware of the two-stage reconfiguration protocol or the need to synchronize configuration changes on both the client and replicas in order to correctly implement the replica-side configuration change specified in C2; instead, this logic can be handled entirely by the replicas. The specific implementation of this approach in practice will vary depending on various aspects, such as the nature of the reconfiguration commands being executed and assumptions regarding the clients(s). For example, if the client-side configuration change relies on different parameters than the replica-side configuration change, reconfiguration operator 302 should include those additional parameters in C2 sent to the replicas. As another example, if any number of clients may be faulty, C2 should define a deterministic strategy for the replicas to follow if some number of clients fail to provide a response regarding the completion of C1.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
receiving, by a replica of a state machine replication (SMR) system, a reconfiguration command directed to the replica;
reaching, by the replica in conjunction with other replicas of the SMR system, a consensus on an execution sequence number for the reconfiguration command; and
executing, by the replica via a reconfiguration engine, the reconfiguration command in accordance with the execution sequence number, the executing of the reconfiguration command comprising applying a configuration change specified in the reconfiguration command to the replica while the SMR system is operational;
wherein the executing includes:
performing a distributed wedge protocol with the other replicas, the distributed wedge protocol causing the replica and the other replicas to agree upon a wedge point at which no further client requests will be processed; and upon reaching the wedge point and determining that a threshold number of the other replicas have also reached the wedge point, executing the reconfiguration command.

2. The method of claim 1 further comprising:
writing a result or status of the executed reconfiguration command to a storage layer of the replica.

3. The method of claim 1 wherein performing the distributed wedge protocol includes:
designating one replica to submit no-op client requests to the SMR system until all non-faulty replicas have reached the wedge point.

4. The method of claim 1 further comprising:
receiving another reconfiguration command directed to a client of the SMR system; and
writing said another reconfiguration command to a storage layer of the replica.

5. The method of claim 4 wherein in response to the writing, the client:
detects and retrieves said another reconfiguration command from the storage layer;
executes said another reconfiguration command on the client; and
sends a client request to the SMR system for writing a result or status of the executed said another reconfiguration command to the storage layer.

6. The method of claim 1 wherein the reconfiguration engine is distinct from an execution engine of the replica configured to process client requests.

7. A non-transitory computer readable storage medium having stored thereon program code executable by a replica of a state machine replication (SMR) system, the method comprising:
receiving a reconfiguration command directed to the replica;
reaching, in conjunction with other replicas of the SMR system, a consensus on an execution sequence number for the reconfiguration command; and
executing, via a reconfiguration engine, the reconfiguration command in accordance with the execution sequence number, the executing of the reconfiguration command comprising applying a configuration change specified in the reconfiguration command to the replica while the SMR system is operational;
wherein the executing includes:
performing a distributed wedge protocol with the other replicas, the distributed wedge protocol causing the replica and the other replicas to agree upon a wedge point at which no further client requests will be processed; and
upon reaching the wedge point and determining that a threshold number of the other replicas have also reached the wedge point, executing the reconfiguration command.

8. The non-transitory computer readable storage medium of claim 7 wherein the method further comprises:
writing a result or status of the executed reconfiguration command to a storage layer of the replica.

9. The non-transitory computer readable storage medium of claim 7 wherein performing the distributed wedge protocol includes:
designating one replica to submit no-op client requests to the SMR system until all non-faulty replicas have reached the wedge point.

10. The non-transitory computer readable storage medium of claim 7 wherein the method further comprises:
receiving another reconfiguration command directed to a client of the SMR system; and
writing said another reconfiguration command to a storage layer of the replica.

11. The non-transitory computer readable storage medium of claim 10 wherein in response to the writing, the client:
detects and retrieves said another reconfiguration command from the storage layer;
executes said another reconfiguration command on the client; and
sends a client request to the SMR system for writing a result or status of the executed said another reconfiguration command to the storage layer.

12. The non-transitory computer readable storage medium of claim 7 wherein the reconfiguration engine is distinct from an execution engine of the replica configured to process client requests.

13. A computer system acting as a replica in a state machine replication (SMR) system, the computer system comprising:
a processor,
a storage layer; and
a non-transitory computer readable medium having stored thereon program code that, when executed, causes the processor to:
receive a reconfiguration command directed to the replica;
reach, in conjunction with other replicas of the SMR system, a consensus on an execution sequence number for the reconfiguration command; and
execute, via a reconfiguration engine, the reconfiguration command in accordance with the execution sequence number, the executing of the reconfiguration command comprising applying a configuration change specified in the reconfiguration command to the replica while the SMR system is operational;
wherein the program code that causes the processor to execute the reconfiguration command includes program code that causes the processor to:
perform a distributed wedge protocol with the other replicas, the distributed wedge protocol causing the replica and the other replicas to agree upon a wedge point at which no further client requests will be processed; and
upon reaching the wedge point and determining that a threshold number of the other replicas have also reached the wedge point, execute the reconfiguration command.

14. The computer system of claim 13 wherein the program code further causes the processor to:
write a result or status of the executed reconfiguration command to the storage layer.

15. The computer system of claim 13 wherein performing the distributed wedge protocol includes:
designating one replica to submit no-op client requests to the SMR system until all non-faulty replicas have reached the wedge point.

16. The computer system of claim 13 wherein the program code further causes the processor to:
receive another reconfiguration command directed to a client of the SMR system; and
write said another reconfiguration command to a storage layer of the replica.

17. The computer system of claim 13 wherein in response to the writing, the client:
detects and retrieves said another reconfiguration command from the storage layer;

executes said another reconfiguration command on the client; and sends a client request to the SMR system for writing a result or status of the executed said another reconfiguration command to the storage layer.

18. The computer system of claim 13 wherein the reconfiguration engine is distinct from an execution engine of the replica configured to process client requests.

* * * * *